Feb. 2, 1954  J. A. KANUCH  2,667,896
UNLOADING VALVE
Filed Oct. 20, 1950
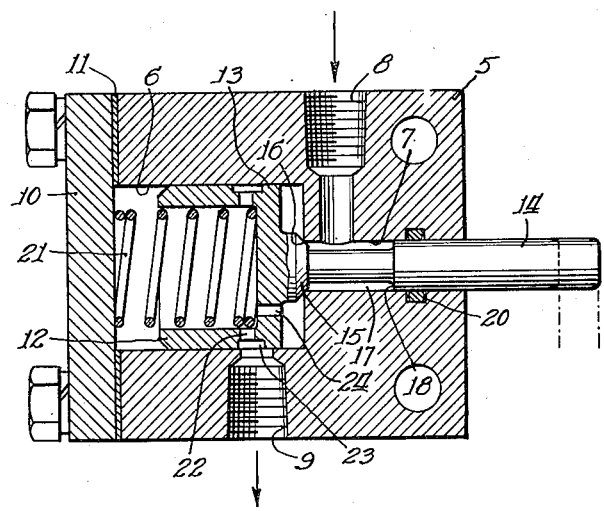
Inventor:
John A. Kanuch
By: Edward C. Fitzbaugh
Atty.

Patented Feb. 2, 1954

2,667,896

UNITED STATES PATENT OFFICE 2,667,896

UNLOADING VALVE

John A. Kanuch, South Euclid, Ohio, assignor to Borg-Warner Corporation, Chicago, Ill., a corporation of Illinois Application October 20, 1950, Serial No. 191,285

10 Claims. (Cl. 137—614.11)

This invention relates to an unloading valve, and more particularly to an unloading valve of the type arranged to remain open, once opened, so long as fluid flows therethrough.

An object of this invention is to provide a new improved unloading valve.

A further object of this invention is to provide an unloading valve arranged to remain closed despite application of pressure thereto until shifted mechanically, electrically or hydraulically to open position, and thereafter to remain open so long as fluid pressure flows through the valve.

In accordance with one embodiment of this invention, an unloading valve may be constructed comprising a balanced spool-type valve formed on a piston rod and arranged to prevent flow of pressure to the piston when seated. A spring associated with the piston urges the spool valve to seated position. By suitable mechanical, electrical or hydraulic means the valve may be shifted, however, to open position whereby pressure is applied then to the piston to shift the valve to completely open position and to permit flow of fluid through the valve to an outlet port. So long as pressure flows through the valve and is applied to the piston, the valve remains open. Upon cessation of pressure, the spring closes the valve.

Other objects and advantages of the present invention will be apparent from the following detailed description thereof taken in conjunction with the drawings wherein:

The single figure is an axial, sectional view of an unloading valve constructed in accordance with one embodiment of this invention.

The unloading valve of this invention comprises a valve housing 5 having a primary valve chamber 6 formed in the left side portion thereof and a secondary valve chamber 7 aligned axially with said first valve chamber and formed in the right portion of the valve housing. The primary and secondary valve chambers communicate at their adjacent ends and the second valve chamber is of substantially lesser dimensions than the first valve chamber. An inlet port 8 is formed in the upper right portion of the valve housing and extends downwardly to communicate with the secondary valve chamber 7 and, therethrough, to the primary valve chamber 6 and ultimately to an outlet port 9 formed in the lower left side of the valve housing. A large, flat, end plate 10 is bolted to the left side of the valve housing 5 and closes the left end of the chamber 6, a gasket 11 being interposed between the end plate 10 and the left end of the housing 5 to provide a seal.

It is the purpose of this unloading valve to provide means whereby fluid pressure applied to the valve through the inlet port 8 may be prevented from reaching the outlet port 9 until a predetermined time at which the valving mechanism, to be described hereinafter, is shifted. Thereafter, it is the purpose of this unloading valve to permit flow to continue through the valve so long as flow exists. In other words, upon a cessation in the pressure applied through the port 8, the valving mechanism is then actuated to again close the passage through the valve.

In accordance with this invention, there is journalled in the primary or large chamber 6 a generally cylindrical valve member 12 having a head 13 at the right end thereof from which extends to the right, axially of the cylindrical valve member, a rod or shaft 14. Shaft 14 extends through the smaller or secondary chamber 7 and is suitably journalled in the valve housing to permit axial shifting movement thereof.

Referring particularly to the head portion 13 of the valve member 12, it will be noted that immediately to the left of the junction of the shaft 14 and the head 13 there is provided a truncated, conical portion 15, which conical surface is adapted to seat on a valve seat 16 defined by the open left end of chamber 7. Also, the left end portion of shaft 14 is reduced in diameter so that when the valving portion 15 of the head 13 is seated on the valving surface 16, there is provided a longitudinally or axially extended annular pressure chamber 17, the right end of chamber 17 being defined by shoulder 18 of the shaft 14. The larger, right end portion of shaft 14 is journalled closely in the right portion of the housing and in order to prevent any leakage of fluid between the periphery of shaft 14 and the inner wall of chamber 7 in this area, sealing ring 20 is disposed about the periphery of shaft 14 and as shown in the drawing, is received in a suitable annular recess formed in the wall of chamber 7.

The valving surface 15 is normally urged into seated relation with valve seat 16 by means of a helically coiled spring 21, the left end of which bears against the right side of cover plate 10 and the right end of which is received within the cylindrical portion of the valve member 12 and bears against the left, inner side of the head 13 thereof.

From the foregoing it will be evident that when pressure is supplied to the valve through the port 8, this pressure is applied equally to the exposed surface of the valving surface 15, particularly the portion of the valving surface 15 lying radially within the valve seat 16 and the shoulder 18. Since the chamber 7 is of uniform diameter throughout, it will be evident that the pressures acting to the left on the above defined portion of the valving surface 15 and to the right on the shoulder 18 are equal and, therefore, no net or resultant pressure is present to cause the valve mechanism to shift to the left to unseat the valving surface 15. Seating of the valve is assured under this condition by virtue of the spring 21.

However, if the extended right portion of shaft 14 be pushed to the left by mechanical, electrical or hydraulic means enough to expose the head or piston portion 13 of valve member 12 to the pressure supplied through the inlet port 8, then the valve mechanism becomes immediately pressure unbalanced, since the area 13 greatly exceeds the area of the pressure responsive surface provided by the shoulder 18, and thus the seating force provided by spring 21 may be readily overcome. It will be understood, of course, that the compression of spring 21 must be suitably selected with reference to the value of the pressure at which unloading is to occur and to be maintained.

When the shaft 14 is shifted to the left, the valving member 12 and particularly the valving surface 15 is then shifted away from the valve seat 16 to permit flow of fluid through the annular passage 17 from the port 8 and thence through the chamber 6 to the outlet port 9.

Flow will continue so long as the pressure of the fluid entering the primary chamber 6 and acting against the piston head surface 13 exceeds the compression force exerted to the right by spring 21 and the similarly directed seating force provided by the shoulder 18. This will be true regardless of whether the mechanism by which the shaft 14 was shifted to the left be released or removed.

In order to prevent hydraulic locking of the action of piston 12, it will be noted that radially extending apertures 22 have been formed in the sides of the cylindrical portion thereof, and these communicate with an annular groove 23 formed about the periphery of member 12 and arranged to be in communication with outlet port 9 on its lower side. The groove 23 has a somewhat greater axial dimension than the apertures 22. Thus, any fluid trapped in the left portion of the chamber 6 is immediately exhausted through the outlet port 9 and conversely, when the flow of fluid through the inlet 8 has dropped in pressure and volume to a point where the pressure spring 21 exceeds the pressure exerted against the piston head 13 from the right, then hydraulic locking of the rightward movement of the valve element 12 in response to spring 21 is prevented by virtue of the groove 23 and passages 22 permitting fluid to be drawn into the left portion of the chamber as necessary to prevent hydraulic lock.

A further feature of the present invention comprises the provision of the small, axially extending passage 24 in the head 13 of the piston. This passage 24 is located radially outwardly of the truncated, conical valving portion 15 and is provided so that fluid trapped in the right portion of the chamber 6 may escape to the left portion and from thence through the radial passages 22 and 23 to the outlet port 9. The size of passage 24 is made sufficiently small so that the operation of the valve mechanism in response to application of fluid pressure to the piston head 13 is not substantially affected by the loss of fluid through this passage 24.

Since the valve member 12, when seated, and particularly the head 13 thereof, tends to prevent fluid leaking past the valving surface 15 from escaping to outlet port 9, it will be apparent then that unless the venting aperture 24 were provided, pressure would tend to build up against the piston head 13 and cause premature shifting of the valve. Venting aperture 24 in addition to preventing hydraulic locking of the action of the valve assembly, permits fluid leaking by the spool valve to escape and thus prevents undesired opening of the valve.

Where herein the various parts of this invention have been referred to as being located in a right or a left position, or an upper or a lower position, it will be understood that this is done solely for the purpose of facilitating description and that such references relate only to the relative positions of the parts as shown in the accompanying drawings.

While but one embodiment of this invention has been shown and described, it will be understood that many changes and modifications may be made therein without departing from the spirit or scope of this invention.

What is claimed is:

1. An unloading valve comprising means defining a piston chamber and a spool valve chamber in fluid communication therewith, a piston journalled in said piston chamber, a balanced spool valve journalled in said spool valve chamber, said spool valve being connected to said piston and movable therewith, resilient means for holding said spool valve normally closed to prevent communication between said spool valve chamber and said piston chamber, and means for shifting said spool valve to open position to place said chambers in communication, the area of said piston exposed to fluid substantially exceeding the oppositely directed area of said spool valve exposed to fluid.

2. An unloading valve comprising a valve housing having a first chamber formed therein and an outlet port leading from said first chamber and a second chamber in communication with said first chamber having an inlet port associated therewith, a valve member journalled in said first chamber having a piston surface formed thereon, said valve member being shiftable to a first position wherein said outlet port is closed and shiftable to a second position wherein said outlet port is opened to said first chamber, a spool valve journalled in said second chamber and connected to said valve member, balanced, oppositely disposed, pressure responsive surfaces on said spool valve exposed to inlet pressure, one of said surfaces comprising a valving surface effective when seated to prevent pressure in said second chamber from entering said first chamber, said piston surface being located with reference to said valving surface so that upon application to said piston surface of pressure from said second chamber said piston surface tends to move said valving surface to unseated position, means for causing said spool valve to shift to open position to expose said valve member piston surface to inlet pressure whereby said spool valve tends to remain open so long as inlet pressure is applied thereto, and means associated with said spool valve for holding said spool valve normally closed.

3. An unloading valve comprising a valve housing having a first chamber formed therein and an outlet port leading from said first chamber and a second chamber in communication with said first chamber having an inlet port associated therewith, a valve member journalled in said first chamber having a piston surface formed thereon, said valve member being shiftable to a first position wherein said outlet port is closed and shiftable to a second position wherein said outlet port is opened to said first chamber, a spool valve journalled in said second chamber and connected to said valve member, balanced, oppositely disposed, pressure responsive surfaces on said spool valve exposed to inlet pressure, one of said surfaces comprising a valving surface effective when seated to prevent pressure in said second chamber from entering said first chamber, said piston surface being located with reference to said valving surface so that upon application to said piston surface of pressure from said second chamber said piston surface tends to move said valving surface to unseated position, means for causing said spool valve to shift to open position to expose said valve member piston surface to inlet pressure whereby said spool valve tends to remain open so long as inlet pressure is applied thereto, and resilient means associated with said spool valve for holding said spool valve normally closed.

4. An unloading valve comprising a valve housing having a first chamber formed therein and an outlet port leading from said first chamber and a second chamber in communication with said first chamber having an inlet port associated therewith, a valve member journalled in said first chamber having a piston surface formed thereon, said valve member being shiftable to a first position wherein said outlet port is closed and shiftable to a second position wherein said outlet port is opened to said first chamber, a spool valve journalled in said second chamber and connected to said valve member, balanced, oppositely disposed, pressure responsive surfaces on said spool valve exposed to inlet pressure, one of said surfaces comprising a valving surface effective when seated to prevent pressure in said second chamber from entering said first chamber, said piston surface being located with reference to said valving surface so that upon application to said piston surface of pressure from said second chamber said piston surface tends to move said valving surface to unseated position, means for causing said spool valve to shift to open position to expose said valve piston surface to inlet pressure whereby said spool valve tends to remain open so long as inlet pressure is applied thereto, and resilient means associated with said spool valve for holding said spool valve normally closed, said piston surface having an area greatly in excess of the oppositely directed pressure responsive surface on said spool valve.

5. An unloading valve comprising a valve housing having a first chamber formed therein and an outlet port leading from said first chamber and a second chamber in communication with said first chamber having an inlet port associated therewith, a valve member journalled in said first chamber having a piston surface formed thereon, a spool valve journalled in said second chamber and connected to said valve member, balanced, oppositely disposed, pressure responsive surfaces on said spool valve exposed to inlet pressure, one of said surfaces comprising a valving surface effective when seated to prevent pressure in said second chamber from entering said first chamber, means for causing said spool valve to shift to open position to expose said piston surface to inlet pressure whereby said spool valve remains open so long as inlet pressure is applied thereto, and venting means associated with said valve member for preventing hydraulic locking of the movement of said valve member.

6. An unloading valve comprising a valve housing having a first chamber formed therein and an outlet port leading from said first chamber and a second chamber in communication with said first chamber having an inlet port associated therewith, a valve member journalled in said first chamber having a piston surface formed thereon, a spool valve journalled in said second chamber and connected to said valve member, balanced, oppositely disposed, pressure responsive surfaces on said spool valve exposed to inlet pressure, one of said surfaces comprising a valving surface effective when seated to prevent pressure in said second chamber from entering said first chamber, means for causing said spool valve to shift to open position to expose said piston surface to inlet pressure whereby said spool valve remains open so long as inlet pressure is applied thereto, and venting means associated with said valve member for preventing hydraulic locking of the movement of said valve member, said piston surface having an area greatly in excess of the oppositely directed pressure responsive surface on said spool valve.

7. An unloading valve comprising a valve housing having a first chamber formed therein and an outlet port leading from said first chamber and a second chamber in communication with said first chamber having an inlet port associated therewith, a valve member journalled in said first chamber having a piston surface formed thereon, said valve member being shiftable to a first position wherein said outlet port is closed and shiftable to a second position wherein said outlet port is opened to said first chamber, a spool valve journalled in said second chamber and connected to said valve member, balanced, oppositely disposed, pressure responsive surfaces on said spool valve exposed to inlet pressure, one of said surfaces comprising a valving surface effective when seated to prevent pressure in said second chamber from entering said first chamber, said piston surface being located with reference to said valving surface so that upon application to said piston surface of pressure from said second chamber said piston surface tends to move said valving surface to unseated position, means for causing said spool valve to shift to open position to expose said valve member piston surface to inlet pressure whereby said spool valve tends to remain open so long as inlet pressure is applied thereto, said piston surface having an area greatly in excess of the oppositely directed pressure responsive surface on said spool valve and means associated with said spool valve for holding said spool valve normally closed.

8. An unloading valve comprising a valve housing having a first chamber formed therein and an outlet port leading from said first chamber and a second chamber in communication with said first chamber having an inlet port associated therewith, a valve member journalled in said first chamber having a piston surface formed thereon, a spool valve journalled in said second chamber and connected to said valve member, balanced, oppositely disposed, pressure responsive surfaces on said spool valve exposed to inlet pressure, one of said surfaces comprising a valving surface effective when seated to prevent pressure in said second chamber from entering said first chamber, means for causing said spool valve to shift to open position to expose said piston surface to inlet pressure whereby said spool valve remains open so long as inlet pressure is applied thereto, and venting means associated with said valve member for preventing premature opening of said valve by permitting escape of pressure leaking past said spool valve.

9. An unloading valve comprising a valve housing having a first chamber formed therein and an outlet port leading from said first chamber and a second chamber in communication with said first chamber and having an inlet port connected thereto, a valve member journalled in said first chamber and having a piston surface formed at the end thereof adjacent said second chamber, said valve member being associated with said outlet port and effective to close the same, a spool valve journalled in said second chamber and connected to said valve member whereby said spool valve and said valve member move together, balanced, oppositely disposed, pressure responsive surfaces on said spool valve exposed to inlet pressure, one of said surfaces comprising a valving surface effective when seated to prevent pressure in said second chamber from entering said first chamber, said piston surface having a motive surface area substantially greater than said other pressure responsive surface on said spool valve and exposed to inlet pressure upon opening of said spool valve, and resilient means associated with said spool valve for holding said spool valve normally in closed position.

10. An unloading valve comprising a housing having a first chamber formed therein and an outlet leading from said first chamber and a second chamber in communication with said first chamber having an inlet leading to said second chamber, a valve member journalled in said first and second chambers, said valve member being shiftable to a first position wherein said outlet port is closed and shiftable to a second position wherein said outlet port is open to said first chamber, said inlet being closed to said first chamber when said valve member is in said first position and open to said first chamber when said valve member is in said second position, means associated with said valve member for holding said valve member normally in said first position, means for moving said valve to said second position, said valve member including means in said second chamber effective to balance inlet pressure in said second chamber whereby said pressure ineffective to move said valve member from said first position, said valve member also including means effective to tend to hold said valve member in said second position once said valve member is shifted from said first position and so long as inlet pressure in said second chamber is applied thereto.

JOHN A. KANUCH.

References Cited in the file of this patent

UNITED STATES PATENTS

| Number | Name | Date |
|---|---|---|
| 720,826 | Lyons | Feb. 17, 1903 |
| 1,716,705 | McEwan | June 11, 1929 |
| 2,211,319 | Camerota | Aug. 13, 1940 |